United States Patent [19]

Kuze et al.

[11] Patent Number: 4,965,944

[45] Date of Patent: Oct. 30, 1990

[54] SQUARING TAPE MEASURE CASE

[76] Inventors: Alexander Kuze, 5412 Cassia Dr., Ft. Pierce, Fla. 34982; Gil Mitchell, 33 Richard Rd., Manchester, Conn. 06040

[21] Appl. No.: 418,512

[22] Filed: Oct. 10, 1989

[51] Int. Cl.⁵ .............................................. G01B 3/10
[52] U.S. Cl. ..................................... 33/760; 33/769; 33/481
[58] Field of Search ................. 33/759, 760, 761, 769, 33/755, 768, 770, 424, 479, 480, 1 N, 429, 481

[56] References Cited

U.S. PATENT DOCUMENTS

| | | |
|---|---|---|
| 834,872 | 10/1906 | Collie et al. ............................ 33/481 |
| 3,008,238 | 11/1961 | Ford . |
| 3,568,322 | 3/1971 | Showers . |
| 3,577,641 | 5/1971 | Smith ................................. 33/760 X |
| 3,824,695 | 7/1974 | McClay, Jr. . |
| 4,227,314 | 10/1980 | Schliep ................................. 33/480 |
| 4,438,538 | 3/1984 | Larsen . |
| 4,476,635 | 10/1984 | Hart . |
| 4,660,292 | 4/1987 | Richardson . |

FOREIGN PATENT DOCUMENTS

| | | | |
|---|---|---|---|
| 0636680 | 12/1963 | Belgium ................................. 33/761 |
| 0035152 | 11/1908 | Fed. Rep. of Germany ........ 33/761 |

Primary Examiner—Harry N. Haroian
Attorney, Agent, or Firm—Ira S. Dorman

[57] ABSTRACT

A measuring rule employs a casing which permits marking of lines perpendicular to an edge of the workpiece, as well as serving to enable measuring and marking of lines at each of a range of angles thereto.

10 Claims, 2 Drawing Sheets

SQUARING TAPE MEASURE CASE

BACKGROUND OF THE INVENTION

Tape measure cases and the like, which serve functions other than the mere containment of the measuring rule, are known in the art. For example, Ford, U.S. Pat. No. 3,008,238, issued Nov. 14, 1961, provides a combination tool having a casing that includes a plate for use in squaring of beams and having ruled markings on extended side edge Walls for marking the depth of cuts. McClay, Jr., U.S. Pat. No. 3,824,695, issued July 23, 1974, shows a fixed flange on a tape measure casing, and U.S. Pat. No. 4,438,538, to Larsen, issued Mar. 27, 1984, provides a combination tool in which the housing has a fixed abutment surface that serves to position side surfaces so that they can function as square cutting guides; Larsen also discloses that the outer surface of the housing can be textured to enable marking with a pencil.

A need remains however for a tape measure having a casing of relatively simple and inexpensive construction, which readily permits measuring and marking of lines that are perpendicular to an edge of a workpiece, or at other angles relative thereto.

Accordingly, it is an object of the present invention to provide novel tape measure having features and advantages in satisfaction of the above-described need. A corresponding object is to provide a novel casing affording such features and advantages and adapted for the containment of an extensible, coiled elongate rule.

SUMMARY OF THE INVENTION

It has now been found that certain of the foregoing and related objects of the invention are readily attained by the provision of a casing for a tape measure, comprised of a laterally spaced pair of substantially identical sidewall portions, and edge wall portions extending between the sidewall portions and cooperating with them to define a chamber for the containment of a coiled rule. The casing has an aperture through an edge wall portion to permit passage of the rule from the chamber, and the casing is substantially symmetrical about a medial plane between its sidewall portions. Each sidewall portion has a planar outer face bounded by two intersecting rectilinear edges, and a curvilinear edge extending between the rectilinear edges. The casing also includes a pair of marginal abutment components, each extending laterally outwardly beyond the outer face of the adjacent sidewall portion and along one of its rectilinear edges, providing an abutment surface in a plane perpendicular to the corresponding face of the sidewall portion and continuous therewith. Each abutment component has a terminal edge element that extends laterally outwardly from the point of intersection of the rectilinear edges of the adjacent sidewall portion. An angle scale extends effectively along the curvilinear edge of each sidewall portion of the casing, which scale is marked to indicate angular displacement relative to the abutment surface contiguous thereto, taken on a arc having as its center point the point of rectilinear edge intersection. As a result, when the casing is disposed with the outer face of one of its sidewall portions lying upon the flat surface of a workpiece, and with the terminal edge element bearing upon a perpendicular surface thereof, the casing can be pivoted on the terminal edge element of the abutment component to permit angular measurements to be made using the angular scale provided.

Normally, the sidewall portions of the casing will be substantially free from protrusions, and in certain instances the outer faces Will be fabricated from a material that is adapted for the receipt of notations made with a writing implement. The abutment components will advantageously be provided by a plate secured to a body of the casing, and linear distance scales will desirably be provided along the rectilinear edges of the sidewall portions that extend perpendicular to the abutment components.

Other objects of the invention are provided by the provision of a tape measure comprised of a casing, as hereinabove described, in combination with a coiled, elongate rule contained Within the chamber thereof. An end portion of the rule extends, in a conventional manner, through the aperture provided in the edge Wall portion of the casing.

DETAILED DESCRIPTION OF THE ILLUSTRATED EMBODIMENT

Figure 1:
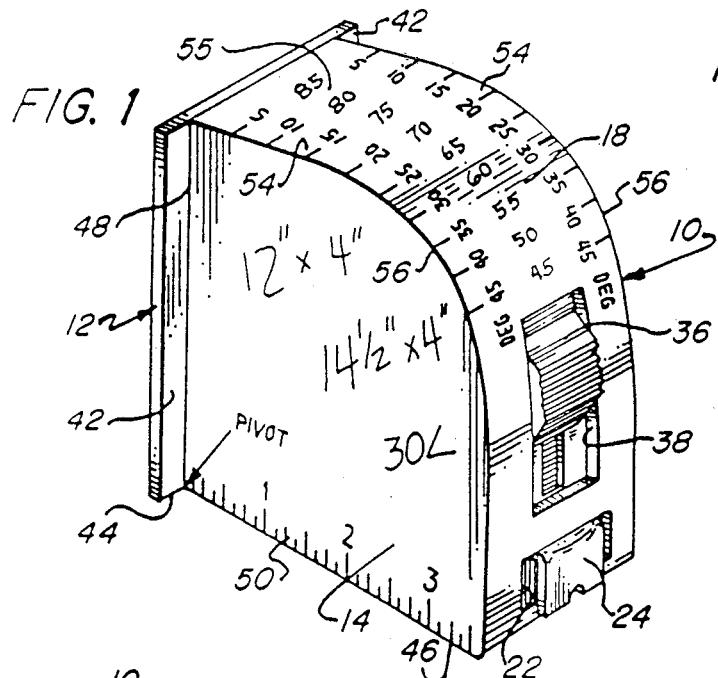
FIG. 1 is a perspective view of a tape measure embodying the present invention.
Figure 2:
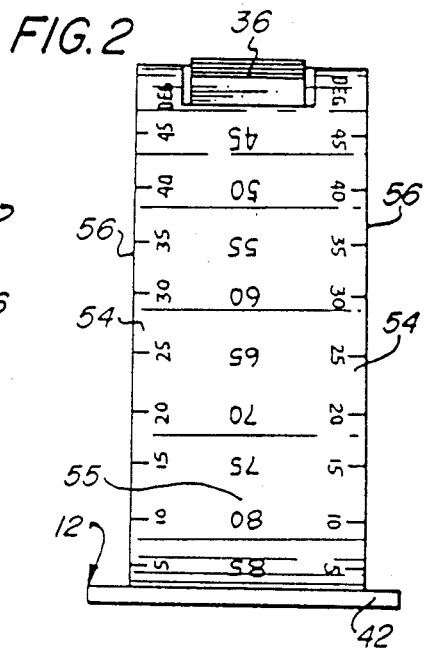
FIG. 2 is a plan view of the tape measure of FIG. 1.
Figure 3:
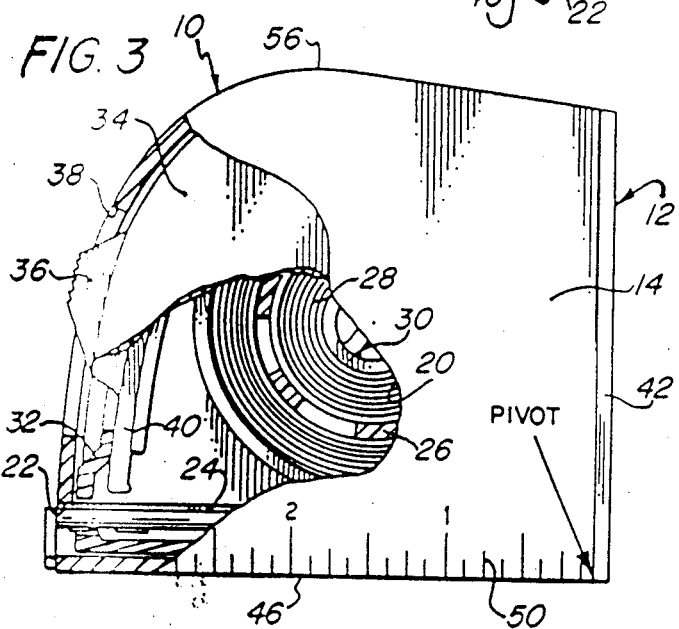
FIG. 3 is a side elevational view thereof, with portions broken away to show internal features.
Figure 4:
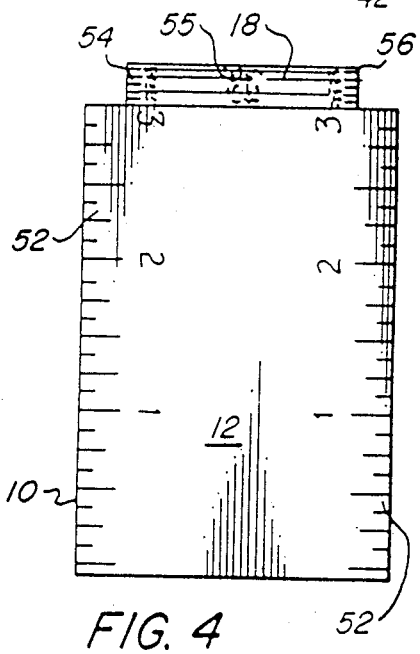
FIG. 4 is an end view of the measure.
Figure 5:
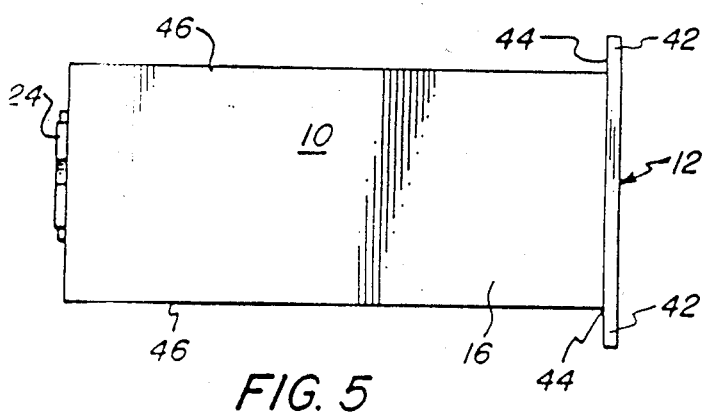
FIG. 5 is a bottom view thereof.

Turning now in detail to the appended drawings, therein illustrated is tape measure embodying the present invention, including a casing consisting of a body, generally designated by the numeral 10, to which is affixed a flat end plate 12. The body 10 consists of a laterally spaced pair of substantially identical sidewall portions 14, a bottom edge portion 16, and a curvilinear edge portion 18, the body and end plate 12 cooperating to define a chamber 20 within the casing. It will be noted that the casing is substantially symmetrical about a plane taken intermediate its sidewall portions 14, and that both of the sidewall portions have planar outer faces that are free from protrusions; the faces may, if so desired, be of a roughened or matte character so as to permit notations to be made thereon (as shown) with a common writing implement such as a pencil or chalk.

A rectangular aperture 22 is formed through the curvilinear edge portion 18 at a location adjacent the bottom edge portion 16, through Which extends the outer end portion of an elongate, flexible (normally metal) measuring rule 24. The rule is wound upon internal core structure 26 of the housing, which in turn seats a coil spring 28 attached to the inner end of the rule 24 and to the hub structure 30; these are of course conventional features of tape measures having a power retraction capability.

Guide structure 32 Within the housing serves not only to assist movement of the measuring rule 24 through the aperture 22, but also for mounting of the locking slide 34. The latter includes an operating button 36, protruding through the opening 38 in the curvilinear edge portion 18 of the casing body 10, and a contact foot 40. As is also conventional in spring motor driven tape measures, the contact foot 40 is used to maintain the rule 24 in position when it has been drawn outwardly to the desired extent, being brought to bear upon it by movement of the locking slide 34 through force on the button 36; the coil spring 20 will of course effect retraction of the rule into the casing when the restraining force of the foot 40 is relieved.

The end plate 12 provides marginal abutment components 42 projecting outwardly along the rectilinear edges 48 on both sides of the casing 10. The components 42 have flat upper surfaces contiguous with and perpendicular to the faces of the adjacent sidewall portions 14, and they have edge elements 44 extending outwardly at the points of intersection of the perpendicular rectilinear edges 46, 48 bounding the sidewall portions. A linear measuring scale 50 extends along the edge 46 on each side of the casing body, and similar scales 52 extend along the margins of the end plate 12, on its outer face. Angle scales 54, 55 are provided on the surface of the curvilinear edge portion 18, and extend along the edges 56 on the opposite sides of the casing, and also along a path therebetween.

Figure 7:
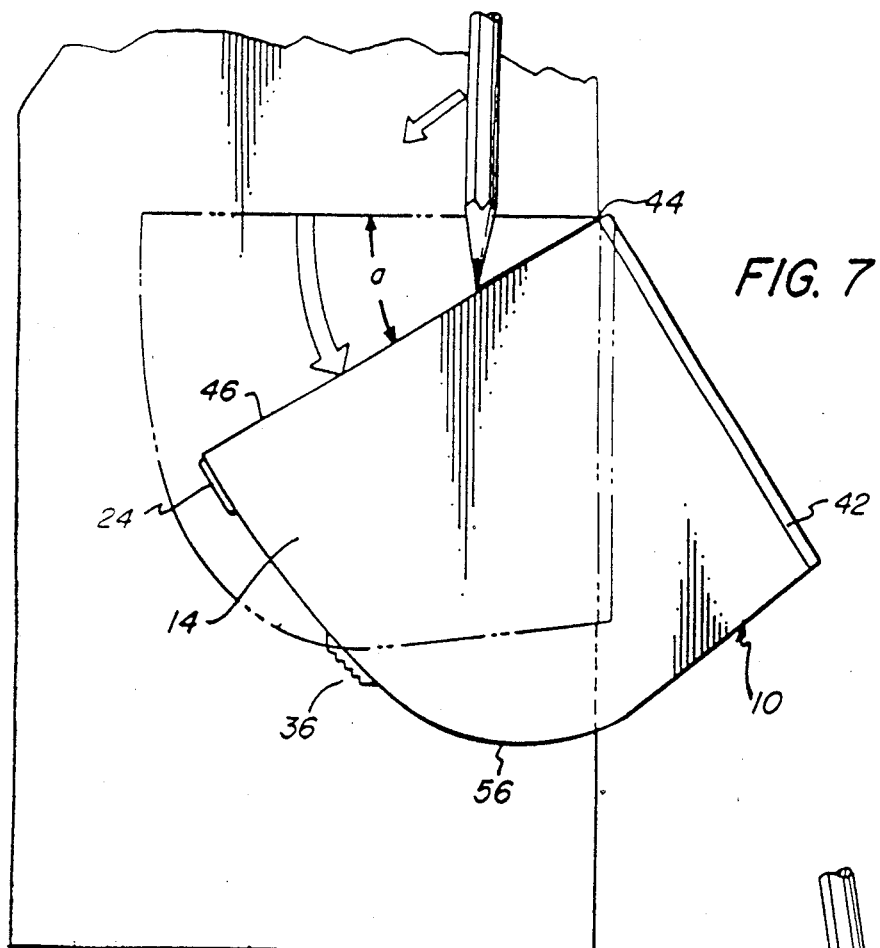
FIG. 7 is a plan view of the tape measure in use as in FIG. 6, also showing it, in phantom line, positioned so as to orient an edge thereof perpendicular to the reference edge of the workpiece.
Figure 6:
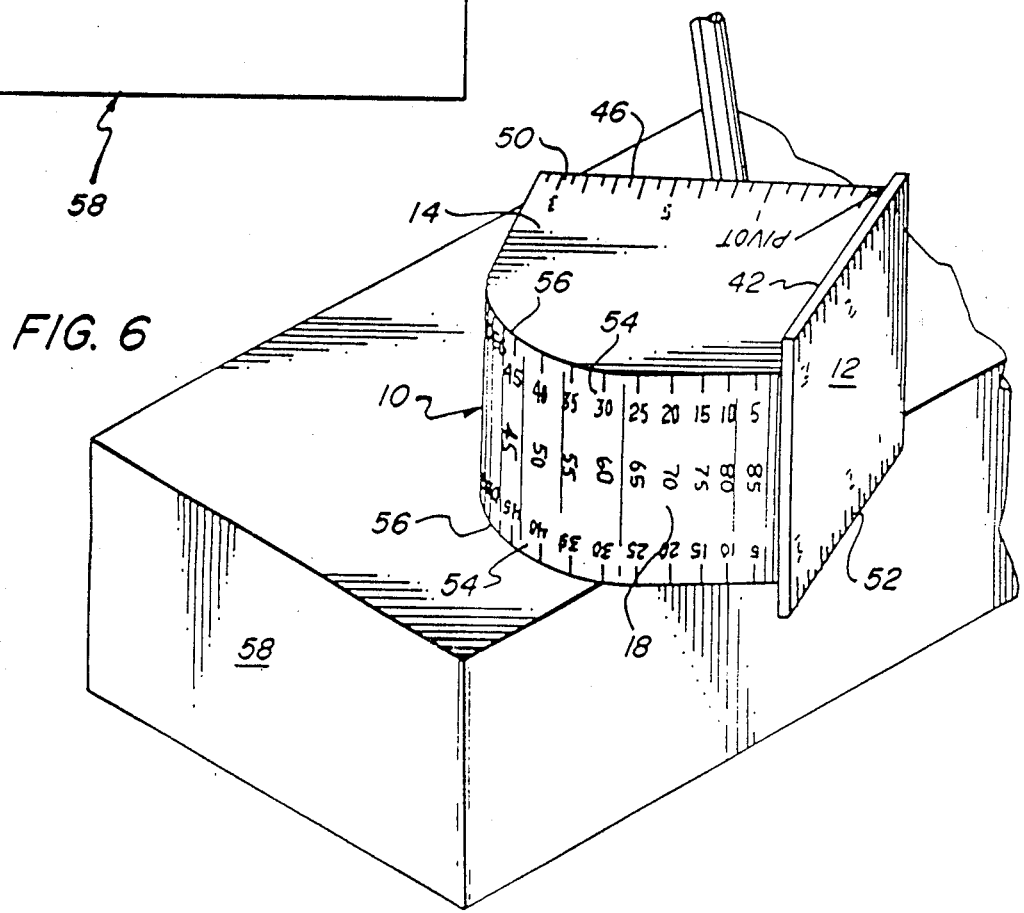
FIG. 6 is a perspective view showing the tape measure of the invention in use for marking a workpiece with a line at a selected angle.

Use of the tape measure of the invention (other than for conventional measuring using the rule 24, the manner of which need not be described) is illustrated in FIGS. 6 and 7. As can be seen, the casing is disposed with the face of one of its sidewall portions 14 lying in direct contact with a flat surface of the board 58. The adjacent abutment component 42 extends over the perpendicular face of the board, and in direct contact with it.

Assuming, as in the case illustrated, that the user of the device wishes to mark a line at angle "a," having a value of 30° with respect to a squaring line across the board 58, he simply pivots the casing about the bearing edge element 44 (marked "PIVOT" in the drawings) until the 30° indicium on the scale 54 is brought into registry with the reference edge, thereby properly disposing the scribing edge 46 to draw the desired line (as shown in FIG. 7). Needless to say, the scale 55 would be used to orient the device at an angle measured from the edge of the board, rather than being taken with reference to a perpendicular squaring line. The scales 50 are used for measuring linear distances on the workpiece along the edges 46, and the scales 52 are of course employed for making measurements along the plate 12.

Although shown as a single piece, for simplicity of illustration, the body of the casing will normally be so constructed as to permit removal of at least one of the sidewall portions 14, thereby permitting facile assembly of other components of the tape measure, particularly the coil spring 28 and the rule 24. As will be evident to those skilled in the art, moreover, additional changes and modifications may be made to the tape measure and casing illustrated, without departure from the concepts underlying the instant invention. For example, the several scales provided may be so modified as to enable their use for carrying out functions other than those that are specifically described herein.

Thus, it can be seen that the present invention provides a novel casing for the containment of an extensible, coiled elongate rule, and a novel tape measure comprising the same, which casing is of relatively simple and inexpensive construction and readily permits measuring and marking of lines that are perpendicular to an edge of a workpiece, or disposed at other angles relative thereto.

Having thus described the invention, what is claimed is:

1. A casing for a tape measure, comprising a laterally spaced pair of substantially identical sidewall portions, and edge wall portions extending therebetween and cooperating therewith to define a chamber for the containment of a cooled rule, said casing being substantially symmetrical about a medial plane between said sidewall portions, each of said sidewall portions having a planar outer face bounded by two intersecting rectilinear edges and a curvilinear edge extending therebetween, said casing having an aperture through the edge wall portion circumscribing said curvilinear edges of said sidewall portions, and said casing also including a pair of marginal abutment components, each extending laterally outwardly beyond said outer face of the adjacent one of said sidewall portions along one of said rectilinear edges thereof, said components providing abutment surfaces contiguous with said faces and in a common plane perpendicular thereto, each of said components having a terminal edge element extending laterally outwardly from the point of intersection of said rectilinear edges of said adjacent sidewall portion, said casing also having at least one angle scale thereon effectively extending along said circumscribing edge wall portion from adjacent said one rectilinear edges and including indicia thereon extending to both of said curvilinear edges, said scale being constructed to indicate angular displacement with reference to said abutment surfaces of said abutment components on arcs having center points at said points of intersections, said casing being pivotable on the associated one of said terminal edge elements when said casing is disposed with said outer face of one said sidewall portions lying upon a flat surface of a workpiece and with said terminal edge element bearing upon a perpendicular surface thereof, to permit angular measurements to be made using said angle scale and to permit scribing of the workpiece surface along the other of said rectilinear edges of said one sidewall portion.

2. The casing of claim 1 wherein said sidewall portions are substantially free from protrusions.

3. The casing of claim 2 wherein said outer faces are fabricated from a material that is adapted for the receipt of notations made with a common writing implement.

4. The casing of claim 1 wherein a linear distance scale is provided along the other of said rectilinear edges bounding each of said sidewall portions.

5. The casing of claim 1 wherein said casing comprises a body, including said sidewall portions, and a plate secured thereto, said plate extending along said one rectilinear edges of said sidewall portions and providing said abutment components extending therebeyond.

6. A tape measure including: a casing for a tape measure, comprising a laterally spaced pair of substantially identical sidewall portions, and edge wall portions extending therebetween and cooperating therewith to define a chamber for the containment of a coiled rule, said casing being substantially symmetrical about a medial plane between said sidewall portions, each of said sidewall portions having a planar outer face bounded by two intersecting rectilinear edges and a curvilinear edge extending therebetween, said casing having an aperture through the edge wall portion circumscribing said curvilinear edges of said sidewall portions, and said casing also including a pair of marginal abutment components, each extending laterally outwardly beyond said outer face of the adjacent one of said sidewall portions along one of said rectilinear edges thereof, said components providing abutment surfaces contiguous with said faces and in a common plane perpendicular thereto, each of said components having a terminal edge element extending laterally outwardly from the point of intersection of said rectilinear edges of said adjacent, sidewall portion said casing also having at least one angle scale thereon effectively extending along said circumscribing edge wall portion from adjacent said one rectilinear edges and including indicia thereon extending to both of said curvilinear edges, said scale being constructed to indicate angular displacement with reference to said abutment surfaces of said abutment components on arcs having center points at said points of intersection, said casing being pivotable on the associated one of said terminal edge elements when said casing is disposed with said outer face of one of said sidewall portions lying upon a flat surface of a workpiece and with said terminal edge element bearing upon a perpendicular surface thereof, to permit angular measurements to be made using said angle scale and to permit scribing of the workpiece surface along the other of said rectilinear edges of said one sidewall portion; and a coiled, elongate rule contained within said chamber of said casing with an end portion of said rule extending outwardly through said aperture of said circumscribing edge wall portion.

7. The measure of claim 6 wherein said sidewall portions of said casing are substantially free from protrusions.

8. The measure of claim 7 wherein said outer faces of said casing are fabricated from a material that is adapted for the receipt of notations made with a common writing implement.

9. The measure of claim 6 wherein a linear distance scale is provided along said other rectilinear edge of said casing.

10. The measure of claim 6 wherein said casing comprises a body, including said sidewall portions, and a plate secured thereto, said plate extending along said one rectilinear edges of said sidewall portions and providing said abutment components extending therebeyond.

* * * * *